June 11, 1968
J. F. WILLIAMS ET AL
3,387,563
CHEMICAL INJECTOR
Filed March 22, 1967
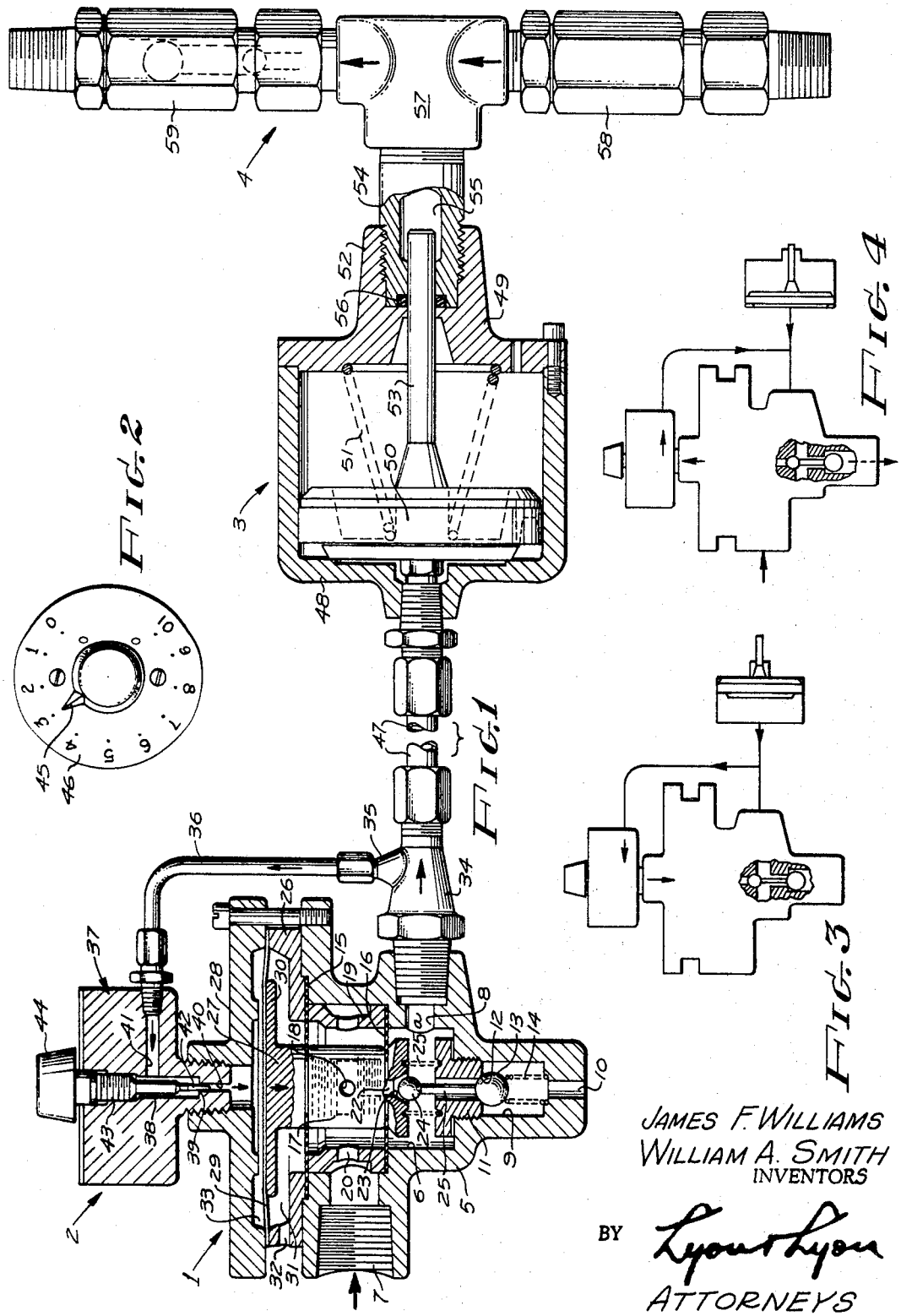
JAMES F. WILLIAMS
WILLIAM A. SMITH
INVENTORS
BY  *Lyon & Lyon*
ATTORNEYS United States Patent Office 3,387,563
Patented June 11, 1968

3,387,563
CHEMICAL INJECTOR
James F. Williams, Sylmar, Calif. (P.O. Box 4365, North Annex, San Fernando, Calif. 91342), and William A. Smith, 4111 Joseph Drive, Bakersfield, Calif. 93307
Filed Mar. 22, 1967, Ser. No. 625,113
4 Claims. (Cl. 103—50)

ABSTRACT OF THE DISCLOSURE

A snap action diaphragm valve, which when closed, vents to atmosphere, is coupled with a needle valve to effect slow pressurization and depressurization of the diaphragm chamber thereby causing the diaphragm valve to open and close periodically according to the setting of the needle valve. The periodic operation of the diaphragm valve is utilized to actuate a pump adapted to inject chemicals into a flow line.

Summary of the invention

This invention is directed to chemical injectors. Devices of this class are used to introduce relatively minute quantities of a chemical into a flow line; for example, odorants into a gas line, or bacteriorants such as chlorine into a water line. Included in the objects of this invention are:

First, to provide a chemical injector which utilizes a novel pneumatic pulsator comprising a diaphragm valve which, in its closed position is vented to atmosphere, and a needle valve arranged to cause slow pressurization and depressurization of the diaphragm chamber so that the diaphragm valve periodically opens to pass a pressure fluid, then closes for another period, then opens.

Second, to provide a chemical injector utilizing the pneumatic pulsator to pressurize a drive cylinder periodically and cause a stroke of its piston; then vent the drive cylinder to permit the return stroke of the piston under spring force. The piston is utilized to operate a small displacement injection pump.

Third, to provide a chemical injector which is particularly compact and requires a minimal amount of pressure fluid, which often may be supplied from the line in which the chemical is injected, and which does not require any motors or other electrical devices; thus providing a chemical injector which may be installed in remote locations and caused to operate for long periods of time without attention.

Description of figures

FIGURE 1 is a partial sectional view, partial elevational view, showing the various components of the chemical injector.

FIGURE 2 is a plan view of the timing dial.

FIGURE 3 is a diagrammatical view of the chemical injector, on completion of the power stroke of the drive piston, and during its dwell period before its return stroke.

FIGURE 4 is a similar diagrammatical view, on completion of the return stroke of the drive piston, and during its dwell period before undergoing a subsequent drive stroke.

Specification

The chemical injector utilizes a diaphragm operated valve 1, which is controlled by a needle valve 2. The two valves form a pulsator, which periodically operates a drive unit 3. The drive unit in turn operates an injection pump 4.

The diaphragm valve 1 may, per se, be conventional. The diaphragm valve includes a valve body 5, having a central cavity 6, which is intersected by an inlet 7, intended to be connected to a source of pressure fluid, and an outlet-backflow inlet 8. The inlet 7 and outlet-backflow inlet 8 are offset with respect to the axis of the cavity 6.

Beyond the outlet-backflow inlet 8, the cavity 6 is constricted to form a vent chamber 9, terminating in a vent port 10. Screwthreaded into the entrance end of the vent chamber 9, is a vent valve ring 11, having a vent valve seat 12 within the chamber 9, engaged by a vent valve 13, backed by a spring 14.

Supported within the cavity 6, between an upper suspension diaphragm 15 and a lower suspension diaphragm 16, is a tubular valve armature 17, having radial ports 18. The diaphragms 15 and 16 are separated by a spacer ring 19, having radial ports 20 to provide communication between the inlet 7 and the interior of the valve armature 17.

The lower suspension diaphragm 16 is secured to the underside of the valve armature 17 by means of a valve disk 21 which screwthreads into the valve armature. The valve disk is provided with a central port 22 communicating with the interior of the valve armature 17, and its lower side is provided with a valve seat 23 which is engaged by a ball valve 24 forming an inlet valve. The inlet valve 24 and the vent valve 13 which is also a ball valve, are disposed in coaxial relation, and a spacer pin 25 is interposed therebetween. A spring 25a urges the armature assembly upward.

The peripheral portion of the upper suspension diaphragm 15 is secured by a clamp ring 26, and its central portion is secured by a clamp disk 27, screwthreaded into the upper end of the valve armature 17. Fitted over the clamp ring 26 is a cover plate 28, and clamped between the cover plate and the clamp ring 26 is a motor diaphragm 29. The upper end of the clamp disk 27 is provided with a flange 30, which underlies the motor diaphragm 29.

The space between the upper suspension diaphragm 15 and the motor diaphragm 29, and within the clamp ring 26, forms a chamber 31, exposed to atmosphere through a port 32. The motor diaphragm 29 and the cover plate 28 form therebetween a motor chamber 33.

The outlet-backflow inlet 8 is connected to a fitting 34, raving a side nipple 35 which is connected by a surge line 36 to a needle valve body 37, the lower end of which is screwthreaded into the cover plate 28.

Formed within the needle valve body 37 is a needle valve chamber 38, having a valve seat 39 and a coaxial port 40 communicating with the motor chamber 33. The needle valve chamber 38 in intersected by a lateral port 41. The needle valve seat 39 is engaged by a needle valve 42, having screwthreads 43 and a handle 44, so that the needle valve may be adjusted axially. The handle 44 is provided with a pointer 45 and the upper side of the needle valve body 37 is provided with a scale disk 46.

The fitting 34 is joined to a flow line 47 which connects the diaphragm valve 1 with the drive unit 3. The drive unit 3 includes a cylinder 48, the closed end of which communicates with the line 47, and the opposite or open end of which is closed by a cap 49. A drive piston 50 is mounted within the cylinder. Interposed between the drive piston 50 and the cap 49 is a return spring 51.

The cap 49 is provided with an internally screwthreaded boss 52, through which extends an injection plunger 53, forming a part of the injection pump 4. The injection plunger protrudes into a sleeve 54, which forms a pump chamber 55. A sealing gland 56 in interposed between the sleeve 54 and the cap 49.

The sleeve 54 is connected by a T-fitting 57, the lateral ends of which are joined to an inlet valve 58 and an outlet valve 59.

The inlet valve is connected to a source of liquid chemical, not shown, and the outlet valve 59 is connected to a main flow line which may be a gas or liquid line, into which it is desired to inject a chemical.

Operation of the chemical injector is as follows:

When the chemical injector is first actuated, the parts are in the position shown in FIGURE 1. That is, the inlet valve 24 is open and the vent valve 13 is closed. The pressure fluid, therefore, flows to the drive unit 3, causing the piston 50 to perform its power stroke and injection plunger 53 to perform its pumping stroke. As the piston performs its drive stroke, the spring 51 is compressed. At the same time, the needle valve 42 slowly admits pressure fluid to the motor chamber 33. The rate of flow is dependent upon the setting of the needle valve.

As the pressure builds up, in the motor chamber 33, the inlet valve 24 closes. This occurs before the vent valve 13 opens. However, due to the fact that the pressure fluid is trapped in the cylinder 48, backflow continues to the motor chamber 33 through the needle valve. Inasmuch as the volume of pressure fluid required is relatively small, this backflow does not materially reduce the pressure of the pressure fluid. This condition is illustrated in FIGURE 3.

Eventually, the motor diaphragm 29 is depressed sufficiently to open the vent valve 13. Once this occurs the back pressure on the motor diaphragm 29 is released quickly so that the pressure fluid escapes from the drive unit through the vent valve 13, under urge from the return spring 51, causing the piston 50 to make its return stroke to the position indicated in FIGURE 4. This movement causes the injection plunger 53 to move through its intake stroke. The return stroke of the drive piston is effected before the pressure fluid can escape from the motor chamber 33. Consequently, there is a dwell period before the pressure in the motor chamber 33 has reached a point permitting the armature 17 to raise, causing the vent valve 13 to close, and the inlet valve 24 to open, so that the cycle may be repeated.

While the pulsator formed by the diaphragm valve 1 and needle valve 2 is shown as connected to a drive unit and injector pump, other apparatus may be connected thereto.

While a particular embodiment of this invention has been shown and described, it is not intended to limit the same to the details of the construction set forth, but instead, the invention embraces such changes, modifications and equivalents of the various parts and their relationships as come within the purview of the appended claims.

We claim:
1. A chemical injector, comprising:
 (a) a chemical injection pump for connection to a source of a liquid chemical, and a flow line including a pumping plunger;
 (b) a power unit including a piston and cylinder, said piston connected to said plunger, said unit responsive to fluid pressure to effect movement in one direction, and including a spring to effect return movement;
 (c) a valve alternately connecting said power unit to a source of pressure fluid, venting said power unit, thereby to cause reciprocation of said piston;
 (d) means including a diaphragm chamber, and a diaphragm forming a wall thereof and joined to said valve to effect operation of said valve;
 (e) and means for alternately pressurizing and depressurizing said diaphragm chamber at a preselected rate to effect periodic movement of said valve and corresponding periodic movement of said power unit.
2. A chemical injector, comprising:
 (a) a chemical injection pump for connection to a source of a liquid chemical, and a flow line including a pumping plunger;
 (b) a power unit including a piston and cylinder, said piston connected to said plunger, said unit responsive to fluid pressure to effect movement in one direction, and including a spring to effect return movement;
 (c) a valve having an inlet for connection to a source of fluid pressure, an outlet-inlet connected to said power unit, and a vent outlet; said valve also including a first valve element controlling flow from said inlet to said outlet-inlet, and a second valve element controlling flow from said outlet-inlet to said vent outlet, an armature connected with said valve elements and movable to open alternately said first and second valve elements, a diaphragm for moving said armature, and means defining a pressure chamber for said diaphragm;
 (d) a surge line between said outlet-inlet and said chamber;
 (e) and a flow control valve interposed in said line to pressurize and depressurize said pressure chamber at a preselected rate thereby to cause periodic flow through said outlet-inlet and move the piston of said power unit in one direction; and alternately permit backflow from said power unit through said vent outlet and permit return movement of the piston of said power unit.
3. A fluid oscillator, comprising:
 (a) a valve structure having an inlet for connection to a source of pressure fluid; an outlet-backflow inlet for connection to a demand for said pressure fluid; and a vent outlet;
 (b) said valve structure including a first valve means which when open establishes communication between said inlet and said outlet-backflow inlet; a second valve means which, when open, establishes communication between said outlet-backflow inlet and said vent outlet; an armature connected with said valve means to open said valve means alternately; a diaphragm for moving said armature; and means defining a pressure chamber for said diaphragm;
 (c) a surge line connecting said outlet-backflow inlet and said pressure chamber;
 (d) and a flow control valve interposed in said line to pressurize and depressurize said pressure chamber when said first valve means is open, and to depressurize said pressure chamber when said second valve means is open, thereby to cause periodic flow of pressure fluid outwardly through said outlet-backflow inlet, and periodic backflow through said outlet-backflow inlet and said vent outlet.
4. A pump for a fluid oscillator, as defined in claim 3, comprising:
 (a) a relatively small pump including a reciprocating plunger, having a pumping stroke and a return stroke;
 (b) and a power unit including a relatively large piston connected to said plunger; a cylinder encasing said piston; and a spring urging said piston in a direction to effect the return stroke of said plunger; said cylinder being connected to said outlet-backflow inlet of said oscillator valve structure to receive pressure fluid on opening of said first valve means, to effect a periodic pumping stroke of said plunger, and, an opening of said second valve means, to cause backflow of said pressure fluid and effect a periodic return stroke of said plunger.

References Cited
UNITED STATES PATENTS 2,018,215  10/1935  Lausen    91—318 XR
2,139,101  12/1938  Spencer    91—318 XR ROBERT M. WALKER, *Primary Examiner.*